Sept. 30, 1969   H. FLEISSNER   3,469,423
APPARATUS FOR THE TREATMENT OF MATERIALS
Filed June 23, 1967   2 Sheets-Sheet 1
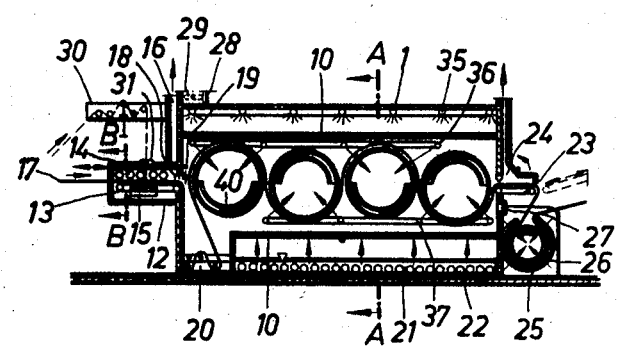
Fig.1
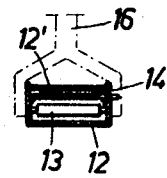
Fig.3 (B-B)
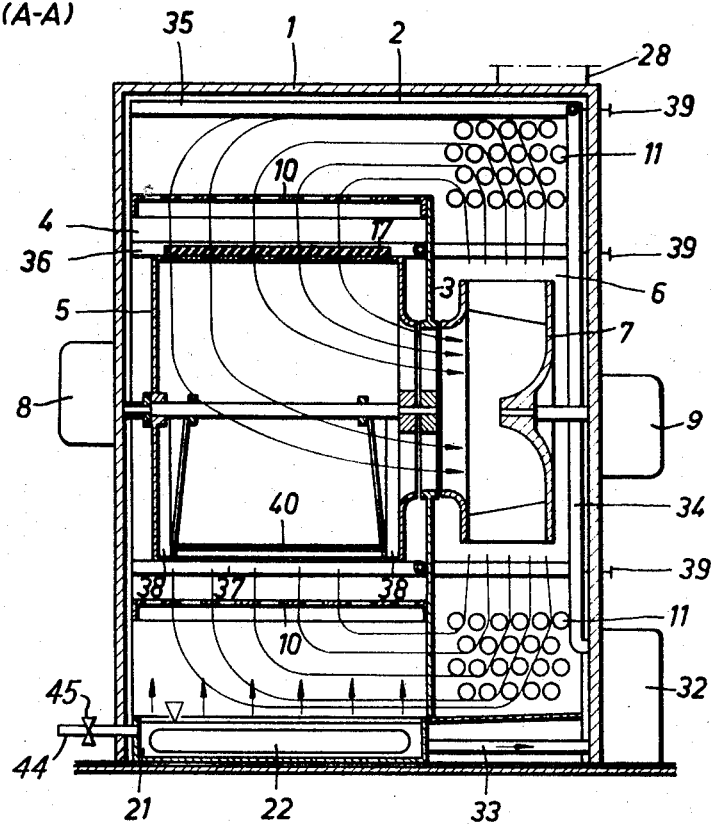
Fig.2 (A-A)
Inventor:
HEINZ FLEISSNER
ATTORNEYS:
BY: Dicke & Craig Sept. 30, 1969  H. FLEISSNER  3,469,423

APPARATUS FOR THE TREATMENT OF MATERIALS

Filed June 23, 1967  2 Sheets-Sheet 2

Inventor:
HEINZ FLEISSNER

ATTORNEYS:
BY: Dicke & Craig

United States Patent Office 3,469,423
Patented Sept. 30, 1969

3,469,423
APPARATUS FOR THE TREATMENT OF MATERIALS
Heinz Fleissner, Egelsbach, near Frankfurt am Main, Germany, assignor to Vepa AG., Basel, Switzerland
Filed June 23, 1967, Ser. No. 648,315
Claims priority, application Germany, June 23, 1966, V 31,335; July 1, 1966, V 31,410
Int. Cl. D06f 39/04, 29/00, 87/00
U.S. Cl. 68—5                         27 Claims

ABSTRACT OF THE DISCLOSURE

A closed treatment housing, at least one conveying means disposed within said housing, inlet means for introducing the material to be treated to said conveying means, fan means for circulating the treatment medium, heating means provided in the circulation zone of the treatment medium, steam-generating means disposed within said housing, means for supplying and discharging drying air to and from said housing, said means capable of being closed in a steam-tight manner and outlet means for removing the material from the apparatus.

Background of the invention

The present invention relates to an apparatus for the treatment, for example, heat-treatment of textile materials in a steam-tight, preferably welded treatment apparatus wherein the material to be treated is conveyed on guiding elements, preferably sieve drums subjected to a suction draft. Fan means are provided for circulating the treatment medium, for example steam, and heating means are used for heating up the steam. The material to be treated is generally textile material in the form of woven and knitted fabrics, needled felts and tufteds, slivers, tow, loose stock or any other form of material, for example, material in yarn form.

The manufacture of steaming devices is relatively expensive especially because of the welded sheet housing which is generally made of aluminum or an acid-resistant material, for example V4A-steel (a type of austenitic steel containing 18% chromium and 8% nickel) and because of the elements required for the generation of steam as well as the steam-tight special inlet and outlet arrangements which are utilized. Hot-air treatment devices of similar design as the steaming devices are generally less expensive than the steaming devices. In contrast to the steaming apparatus, the hot-air treatment apparatus are provided with opening for drawing in fresh air and discharging the stale air, for example the air enriched with liquid. Furthermore, these apparatus differ with respect to the design of the inlet and the outlet means. With these apparatus, the inlet generally consist of a conveyor belt which is provided with a roller means at its inlet opening for sealing. Instead of the conveyor belt, a roller may be also used. At the discharge end of the apparatus, a conveyor belt, a chute, a pair of rollers or the like can be provided, depending on the particular material being treated by the apparatus. On such apparatus, woven and knitted fabrics, needled felts and tufted carpets, as well as tow, slivers, yarn and loose stock can be treated.

There are a number of companies which use steaming devices for textile material as well as drying devices, setting devices and washing devices. Setting up all of these devices requires considerable space and a considerable capital expenditure. In smaller companies, these devices are generally not fully utilized. Accordingly, small companies cannot afford the investment costs required for purchasing individual steaming devices, drying devices, setting devices, washing devices, etc., which are used in the treatment of textile materials.

Summary of the invention

An object of the present invention is to avoid the prior art disadvantages in the treatment of materials, for example, textile materials.

Another object of the present invention is to provide an apparatus for the treatment of textile materials which is capable of performing a number of functions, such as for example, steaming, drying, setting, and washing textile materials.

A further object of the present invention is to provide an improved apparatus for the treatment of textile materials wherein effective use of the apparatus can be achieved in a limited amount of space.

A still further object of the present invention is to provide an improved apparatus for the treatment of textile materials which can be used for many treatment processes, such as, for various hot-air treatments, e.g., drying, thermosol dyeing, heat-setting, curing and polymerizing synthetic resin impregnations, steaming with saturated or superheated steam as is required for dyestuff fixation, and treatments with steam-air mixtures, e.g., bleaching.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated by providing an improved apparatus which is capable of performing a number of treatment processes, such as steaming, drying or other hot-air treatments, thermosol dyeing, heat setting, curing, polymerizing, bleaching, and the like. The apparatus of the present invention contains a steam-generating means which can be switched on and off. This steam-generating device comprises a heated sump at the bottom of the housing of the apparatus which is equipped with a water supply, water drain and heating means, all of which can be effectively controlled by switching them on and off. The treatment housing of the apparatus is also provided with a means for supplying and discharging drying air to and from said housing, said means capable of being closed in a steam-tight manner. In order to ensure for the effective hot-air treatments using air exchange on the counter-current principle, it is desirable to provide inlet means for the supply of atmospheric air at the suction side of the last sieve drum and outlet means for discharging the moisture-saturated air at the inlet side of the treatment housing at the fan side. Thus the blowing effect of the fan means can be utilized for discharging the moist air from the treatment housing.

According to the present invention, it is suggested to provide the apparatus with a fabric feeding device generally used for dryers, for example, an inlet creel provided with a cloth guide and preferably with an infinitely variable pair of inlet rollers which permit a material overfeed, or alternatively providing a housing at the inlet subjected to a suction draft which contains a conveying element, for example, a conveyor belt, a roller conveyor or the like. The ceiling of the inlet housing which advantageously can be heated, is either at least partially removable or tiltable or the conveying element extends out of the inlet housing in order to make possible the introduction of the material to be treated onto the conveying element at the inlet. With the apparatus of the present invention, it is desirable to provide an infinitely variable pair of inlet rollers above the removable and/or tiltable part of the ceiling of the inlet housing and/or above the intake conveyor belt extending out of the housing. The heating elements for heating the ceiling of the inlet housing may be rigidly mounted to the side walls of the housing so that they do not interfere with the rapid removal and mounting of the ceiling of said housing.

The exhaust duct which is connected to the inlet housing is generally not heat-insulated. Therefore, if the duct is mounted to the ceiling of the housing as is frequently done, there is the danger that condensate will form in the exhaust duct which will then drop onto the material being fed to the apparatus. In order to avoid material damage due to condensate droplets, it is suggested, according to another embodiment of the present invention, to provide the exhaust in the inlet housing at the side of the conveying element, for example, adjacent to the conveyor belt. For this purpose, at least one exhaust opening is provided in one or in the two side walls of the inlet housing. The exhaust opening may also be provided at the side of the conveying element in the ceiling of the inlet housing. With this arrangement, condensate is prevented from dropping onto the material being fed to the apparatus and thus contamination of the material being treated is safely avoided.

When using a conveyor belt as the conveying element at the inlet which partially extends out of the steamer and thus comes into contact with the cooler atmosphere outside the steamer, there is the increased danger that condensate may deposit on the cooled-down inlet conveying element and contaminate the material to be treated. This can be prevented by heating the inlet conveying element, preferably after it leaves the steaming chamber. With this arrangement, the conveyor belt which leaves the steaming chamber in a wet condition is dried by heating, so that if the apparatus is used for example, for dyeing, smearing or bleeding of the dyestuffs is safely avoided.

With the steamers which have been used up to now, especially when sieve drums subjected to a suction draft are employed as conveying elements, it is extremely difficult to seal the inlet and the outlet to prevent air from entering the housing because the suction draft of the sieve drums which are situated adjacent to the inlet and the outlet draws air into the steaming chamber. According to another feature of the present invention, this problem can be overcome by arranging near the inlet and also possibly near the outlet in the treatment chamber, and at least at the suction side of the first sieve drum and possibly at the last sieve drum, a steam-discharge tube with nozzle openings. These tubes extend over the entire working width and discharge steam toward the inlet opening and possibly also toward the outlet opening of the treatment chamber. It is also desirable if this steam-discharge tube is provided with a control which permits an infinite variation of the steam quantity flowing from the nozzles. The quantity of steam emerging from the tube should at least be large enough to compensate the suction effect of the conveying elements at the inlet opening and possibly at the outlet opening of the apparatus, for example at the first and/or the last sieve drums. It is desirable to regulate steam quantities such that a slight excess pressure is maintained at the inlet and at the outlet which causes small steam quantities to flow out of the treatment housing thus preventing air from entering the treatment chamber. This slight excess amount of steam also removes the air adhering to the material when it enters the treatment chamber. This steam/air mixture is then exhausted from the inlet housing. The same effect can be obtained if the treatment chamber is subjected to a slight excess pressure. With treatments using steam/air mixtures, this device at the inlet and at the outlet can be switched off.

Furthermore, it is advantageous if the upper edge of the inlet opening is heated so that the condensate which may possibly form at the face walls is evaporated before it drops onto the material to be treated.

According to another embodiment of the present invention, the present apparatus can be applied to a washing process by providing a spraying system, for example, spray or nozzle tubes, at those portions of the sieve drums which carry the material to be treated. The liquid supplied to the material to be treated by means of these tubes is drawn through the material by the suction draft of the sieve drums or a sieve conveyor belt and is collected in the baffles and the lower portion of the sieve drum until the head of water exceeds the suction draft. When this occurs, the water then flows out of the lateral perforation of the sieve drum which is not covered by the baffle means and drops into the sump provided at the bottom of the housing. In order to render it possible to use the washing liquor several times, a circulation system is provided for the washing liquor. This may be effected by connecting a pump to the water drain of the sump which forces the water or the liquor flowing out of the sump through the spray and/or nozzle tubes to the material to be treated. The saturated air enriched with the washing liquor increases the washing effect, so that extremely short washing times are sufficient. Furthermore, this device offers the added advantage that a rapid cleaning of the sieve drums and the parts which, for example, in dyeing, come into contact with the dyestuffs is possible. This can be achieved by switching on the washing device and letting it run for a short time as a washing device while not being loaded with the material to be treated. Then the washing device is switched off and the apparatus is heated in order to dry it. Generally, this washing and drying process requires only a few minutes. Thus, the preparing and cleaning times when changing colors in treatment processes may be substantially reduced. In addition, a spraying device may be also arranged at the ceiling of the housing for cleaning purposes. The other spray and nozzle tubes are preferably arranged near the drum in order to increase the washing effect by the jetting action of the spray.

The materials which can be treated by the apparatus of the present invention include any of the natural or synthetic fibers. The natural fibers can include cotton, wool, silk, cellulose, etc., and the synthetic fibers may comprise synthetic polymers such as polyolefins, e.g., polyethylene, polypropylene, etc., polyamides, e.g., nylon 6 obtained by the condensation of caprolactam, nylon 66 obtained by the condensation of hexamethylenediamine with adipic acid, etc., polyesters, e.g., polyethylene terephthalate, etc., phenolic resins, e.g., phenol formaldehyde resins, urea formaldehyde resins etc., polyvinyl materials, e.g., polyvinyl chloride, polyvinyl acetate, etc., acrylate resins, e.g., polymethylmethacrylate, copolymers of these materials with one another or with ethylinically unsaturated monomers, and similar type polymers. The apparatus of the present invention is also applicable to blends of the above-mentioned textile materials.

At first glance it seems paradoxical to have an expensive steaming device operate as a hot-air treatment plant, for example, as a dryer, because dryers, especially sieve drum dryers are manufactured at significantly reduced expense as compared with steaming devices, especially sieve drum steaming devices. Nevertheless the use of the steaming apparatus in accordance with the present invention as a hot-air treatment plant offers in many cases significant advantages. For example, there are a number of companies which use steaming devices for textile materials as well as drying devices, setting devices and washing devices. Setting up all of these devices requires considerable equipment and space costs. In smaller companies these devices are generally not fully utilized. For these companies the present invention offers the particular advantage that only one apparatus is required to perform many functions instead of a plurality of devices. Thus, the expense of several separate devices can be avoided, which up to now was not feasible. It is not possible to modify a standard dryer, especially a sieve drum dryer to a steaming device in a simple and inexpensive manner. However, according to the present invention it is possible to modify a steaming device to a hot-air treatment device and to a washing device in an effective and efficient manner.

The apparatus of the present invention can be also advantageously used in the research departments of larger companies. In this way, the seemingly paradoxical use of a steaming device as a dryer and as a washing unit is of particular advantage and for these companies it means a considerable technical advance which includes savings in space, considerable savings of equipment costs and a good utilization of the apparatus. The present invention is not limited to a device with sieve drums subjected to a suction draft but may also be applied, for example, to a device with one or several steam and air-permeable conveyor belts.

With hot-air treatment plants it is advantageous to provide at the outlet and outside of the treatment chamber a cooling means. For the apparatus of the present invention, it is suggested to use as a cooling means a sieve drum means subjected to a suction draft which is designed in such a way that in steaming processes it can be employed as an exhaust device. This is possible by providing in the sieve drum a baffle which is designed, for example, shutter-like and which is closed when it is used as an exhaust device so that only a small exhaust opening exists and a fairly high vacuum is produced in the sieve drum. If the suction drum is used for cooling, the shutter-like baffle is opened and the whole sieve drum is thus subjected to a suction draft. Instead of the shutter-like baffles, two overlapping baffles may be also provided which are for example perforated and which are either arranged so that the perforations are covered or superimposed so that the baffle is airpermeable. In order to avoid contaminations from the atmosphere from being drawn in, it is suggested to surround the sieve drum with a filtering basket.

For many types of treatment, it is expedient if the treatment medium is applied in the treatment atmosphere directly. For this purpose, it is often desirable to provide at least one impregnating device in the treatment chamber of the apparatus. The impregnating device may be designed as an immersion device or as a spraying device.

Brief description of the drawings

The present invention will become fully understood from the detailed description hereinbelow and the accompanying drawings which are given by way of illustration only and thus are not limitative of the present invention and wherein, FIGURE 1 is a longitudinal section of the apparatus according to the present invention;

FIGURE 2 is a cross-sectional view of the apparatus according to FIGURE 1;

FIGURE 3 is a cross-sectional view of the inlet of the apparatus according to FIGURE 1;

Description of the preferred embodiments

Figure 4:
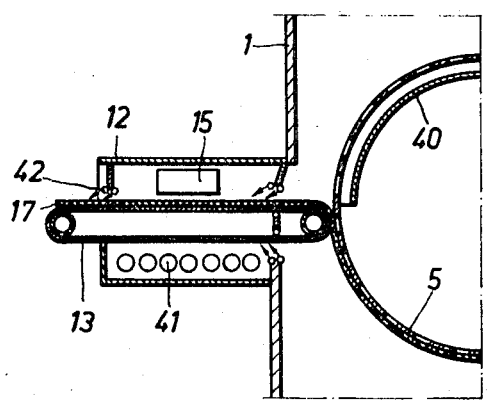
FIGURE 4 is a longitudinal section of another inlet arrangement according to the present invention.

Referring now to the drawings wherein like reference numerals are used throughout the various views to designate like parts, the apparatus of the present invention comprises a heat-insulated housing 1 with an internal welded sheeting 2 which preferably is provided at a distance from the heat-insulated housing 1, so that the housing is absolutely steam-tight. By a partition means 3 extending substantially over the whole length of the chamber, the interior of the housing is subdivided into a treatment chamber 4 with sieve drums 5 subjected to a suction draft and into a fan chamber 6 with fan wheels 7 which are correlated to the faces of the sieve drums. A drive 8 for sieve drums 5 and a drive 9 for fan wheels 7 are arranged outside the treatment chamber at the heat-insulated housing. Above and beneath the sieve drums 5 are arranged sieve sheets 10 which serve for equalizing the circulated treatment medium. Above and beneath the fan wheels 7 heating means 11 are provided which in the embodiment shown comprises steam-heated tubes. However, other types of indirect and direct heating means may be used. The heating means 11 may also be provided in other locations within the circulation of the treatment medium, for example, above and beneath the sieve sheets 10 in the treatment chamber 4.

At the inlet to the treatment chamber there is provided a housing 12 subjected to a suction draft in which a conveyor belt 13 and a heating means 14 are accommodated. Exhaust openings 15 are provided in the two side walls of the housing 12. This prevents the condensate which may form in suction duct 16 from dropping onto material 17. The inlet opening to the treatment chamber is sealed by a labyrinth packing 18. Above this packing a tube 19 is arranged which discharges steam, thus producing a slight excess of pressure at the inlet which prevents air from entering the treatment chamber.

In the embodiment of the present invention shown in FIGURE 1, the material 17 to be treated is passed through an impregnating device 20 arranged at the bottom of the treatment chamber. This impregnating device is only required for special treatments, for example, for certain dyeing processes, including the application of reducing agents, etc. Furthermore, a sump 21 with a heating means 22 for the generation of saturated steam is provided at the bottom of the apparatus.

At the outlet of the apparatus another conveyor belt 23 is arranged which is provided with a hood 24 subjected to a suction draft. Part of the hood is swivel mounted and can be tilted upward. Instead of the conveyor belt 23, a pair of rollers or a chute may be also used. Beneath the conveyor belt a sieve drum 25 subjected to a suction draft is arranged which serves for cooling the material. The sieve drum is surrounded with a filtering basket 26 for filtering the ambient air. As shown by the dashed line, the material 17 may be passed directly to another conveyor belt without being treated on sieve drum 25.

The apparatus shown is used as a steamer. However, this apparatus can also be used as a dryer or as another hot-air treatment apparataus. For this purpose, a suction opening 27 for fresh air which can be closed in a steam-tight manner is provided at the outlet and an air discharge duct 28 which can also be closed in a steam-tight manner by means of a swiveling flap 29 is provided near the inlet. If the apparatus is used for a hot-air treatment process, the ceiling 12' of the housing 12 is removed and the material is passed via an inlet creel 30 as shown by the dashed lines to the treatment chamber. A pair of intake rollers 31 renders it possible to overfeed the material to conveyor belt 13. Generally the conveyor belt 13 is adjustably mounted and, in this case, may be moved close to the first drum. The device 22 for the generation of steam is switched off during a hot-air treatment and the liquid is drained from sump 21. The sump is provided with a water supply means 44 containing valve shut-off means 45.

Especially when used for dyeing, the apparatus can be advantageously provided with a spraying system for rapid cleaning. Such a spraying system is provided in the device shown and consist of a pump 32 which draws the liquid out of a sump 21 through a pipe 33 and supplies it through another pipe 34 to a number of spray and nozzle tubes 35, 36 and 37. The spray tubes 35 are mounted to the ceiling of the housing and extend over the whole width of the device, so that the heating means 11 can be also cleaned by them. The spray and nozzle tubes 36 and 37 are correlated to the sieve drums, i.e., to that portion of the sieve drums which carries the material being treated. By means of this arrangement the device can be cleaned rapidly and thoroughly.

Because of the spraying system, it is also advantageous to use the present apparatus as a washing unit. In this situation, the material 17 is sprayed with the washing liquor. The suction draft of the sieve drum ensures a uniform and intensive wetting and penetration of the material by the washing liquor. The washing liquor which is drawn through the material is collected at the lower portion of the sieve drum and flows through the perforations of the non-baffled marginal zones 38 and out of the sieve drum. The liquid is collected in sump 21. The liquor circulation cycle is thus completed. In the branch pieces of pipe 34 valves are provided which can be opened and closed by means of handwheels 39. Thus, it is possible to individually control the groups of sprays and nozzle tubes 35, 36 and 37.

Also, in the present apparatus the suction draft is interrupted by means of baffles 40 at that portion of the sieve drum which is not covered with the material being treated. This apparatus can also be used for materials wherein only one side may come into contact with the conveying elements. For this purpose, it is necessary to provide the drums which usually guide the material at their lower portions with a gear which reverses the rotation and swivels the baffles 40 by about 180°.

Figure 5:
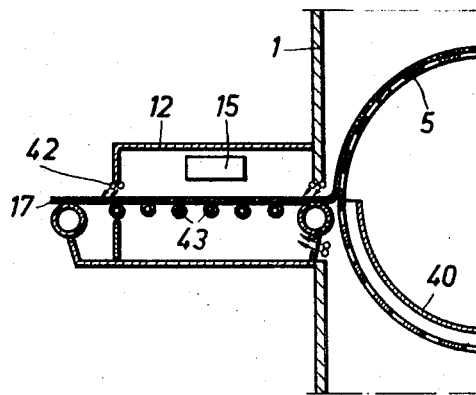
FIGURE 5 is a longitudinal section of still another embodiment of the inlet arrangement according to the present invention.

FIGURES 4 and 5 show two modifications of the inlet arrangement. The elements which are used in the apparatus of FIGURES 1–3 are marked with the same numbers in FIGURES 4 and 5. In the embodiment according to FIGURE 4, a heating means 41 is provided underneath the conveyor belt 13 and is utilized when the apparatus is used as a steamer. This heating means dries the conveyor belt 13 leaving the steam atmosphere so that the formation of water droplets or water film on conveyor belt 13 is avoided which, in the case of dyeing for example, may detrimentally effect the material. The face walls of housing 12 are provided with heated lips 42 which evaporate the condensate forming at the walls before it can drop onto the material to be treated. The inlet arrangement according to FIGURE 5 is of similar design as that of FIGURE 4. However, instead of a conveyor belt 13 a roller conveyor 43 is used. The material may be guided on the upper portion of the first sieve drum as shown in FIGURE 5 or on the lower portion of the first sieve drum as shown in FIGURE 4. The present invention can also be advantageously applied to a conveyor belt steamer with a blower for the circulation of the steam. In addition, all of the open-close devices used in the apparatus of the present invention can be manually or automatically controlled.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:
1. An apparatus for the treatment of materials and adapted to operate under a steam atmosphere and also under a hot air atmosphere which comprises a steam-tight treatment housing, at least one conveying means disposed within said treatment housing, inlet means for introducing the material to be treated to said conveying means, fan means for circulating the treatment medium, heating means provided in the circulation zone of the treatment medium, steam-generating means disposed within said treatment housing, means for supplying and discharging drying air to and from said treatment housing, said means capable of being closed in a steam-tight manner and outlet means for removing the material from the apparatus.

2. The apparatus of claim 1, wherein the conveying means is a sieve drum means subjected to a suction draft.

3. The apparatus of claim 1, wherein an internal steam-tight sheeting is provided in the treatment housing which extends a distance from said treatment housing, but in close proximity thereto.

4. The apparatus of claim 1, wherein the inlet means is at least partially disposed within a substantially horizontal inlet housing provided at the inlet of the steam-tight treatment housing, said inlet housing containing heating means and provided with a suction draft.

5. The apparatus of claim 4, wherein exhaust openings are provided in the inlet housing.

6. The apparatus of claim 4, wherein the inlet housing communicates with the treatment housing through an inlet opening which is provided with a labyrinth packing.

7. The apparatus of claim 6, wherein steam-discharge means are provided in the treatment housing at the inlet opening which produces a slight excess of pressure at the inlet and thus prevents air from entering the steam-tight treatment housing.

8. The apparatus of claim 4, wherein the means for supplying and discharging drying air comprises a suction opening for supplying fresh air to the treatment housing and a discharge opening for removing spent air from the treatment housing.

9. The apparatus of claim 8, wherein the ceiling of the inlet housing is tiltable and removable and the material to be treated is conveyed via inlet creel means to the inlet means.

10. The apparatus of claim 9, wherein roller means are provided between the creel means and the conveying means.

11. The apparatus of claim 4, wherein the inlet means is a conveyor belt, the heating means is provided beneath the conveyor belt and the face walls of the inlet housing are provided with heated lip means.

12. The apparatus of claim 11, wherein the inlet means is a roller conveyor means.

13. The apparatus of claim 1, wherein immersion impregnating means are disposed at the lower portion of the treatment housing.

14. The apparatus of claim 1, wherein the steam-generating means comprises a sump means associated with a heating means.

15. The apparatus of claim 14, wherein the treatment housing is provided with a spraying system.

16. The apparatus of claim 15, wherein the spraying system comprises pipe means containing nozzle means, said pipe means disposed throughout said treatment housing and communicating with the sump means through a pump means.

17. The apparatus of claim 1, wherein the outlet means is provided with a hood means subjected to a suction draft, said hood means being swivel mounted and tiltable in the upward direction.

18. The apparatus of claim 1, wherein beneath the outlet means is disposed a sieve drum means subjected to a suction draft which serves either for cooling the material to be treated or as a suction device, said sieve drum means being surrounded with a filtering means for filtering the ambient air.

19. An apparatus for the treatment of textile materials and adapted to operate under a steam atmosphere and also under a hot air atmosphere which comprises a steam-tight treatment housing, partition means dividing said housing into a treatment chamber and a fan chamber, at least one sieve drum means rotatably disposed within said treatment chamber, inlet means for introducing the material to be treated to said sieve drum means, fan means disposed within said fan chamber for circulating the treatment medium, heating means provided in the circulation zone of the treatment medium, steam-generating means disposed in the lower portion of said treatment housing, suction and discharge openings for supplying fresh air and discharging spent air to and from the treatment housing, said openings being provided with steam-tight closures and located near the outlet means and inlet means respectively and outlet means for removing the material from the apparatus.

20. The apparatus of claim 19, wherein the steam-tight treatment housing is provided with a spraying system comprising sump means disposed in the lower portion of the treatment housing, pipe means containing nozzle means, said pipe means disposed throughout said treatment housing, said pipe means communicating with said sump means through a pump means.

21. The apparatus of claim 20, wherein said sump means is associated with a heating means.

22. The apparatus of claim 21, wherein the sump means is provided with a water supply means.

23. The apparatus of claim 20, wherein the nozzle means are disposed near the sieve drum means and extend over the whole working width thereof at that portion of the sieve drum means containing the material being treated.

24. The apparatus of claim 20, wherein nozzle means are provided at the ceiling of the treatment housing, said spraying system being provided with at least one valve means for switching the spraying means on and off.

25. The apparatus of claim 19, wherein baffle means are provided at that portion of the sieve drum means which are not covered with the material being treated.

26. The apparatus of claim 19, wherein the suction opening is provided at the suction side of the last sieve drum and the discharge opening is provided at the inlet side of the treatment housing at the fan side.

27. The apparatus of claim 1, wherein the means for supplying and discharging drying air to and from the treatment housing are provided in the vicinity of the outlet means and the inlet means, respectively, of the treatment housing.

References Cited
UNITED STATES PATENTS

| | | | |
|---|---|---|---|
| 2,441,992 | 5/1948 | Converse | 68—5 |
| 2,833,136 | 5/1958 | Prince et al. | 68—5 |
| 3,011,266 | 12/1961 | Fleissner | 68—5 X |
| 3,074,261 | 1/1963 | Wilcox | 68—5 |
| 3,098,371 | 7/1963 | Fleissner | 68—5 |

WILLIAM I. PRICE, Primary Examiner

U.S. Cl. X.R.

34—115